United States Patent [19]

Griffen

[11] Patent Number: 4,657,097

[45] Date of Patent: Apr. 14, 1987

[54] LOAD CELL

[75] Inventor: Neil C. Griffen, Westerville, Ohio

[73] Assignee: Reliance Electric Company, Cleveland, Ohio

[21] Appl. No.: 786,719

[22] Filed: Oct. 15, 1985

Related U.S. Application Data

[63] Continuation of Ser. No. 579,488, Feb. 13, 1984, abandoned.

[51] Int. Cl.[4] ............... G01G 3/14; G01G 3/08
[52] U.S. Cl. ............................. 177/211; 177/229; 73/1 B; 73/862.65; 73/862.66
[58] Field of Search ............... 177/211, 229; 73/1 B, 73/862.65, 862.66, 767

[56] References Cited

U.S. PATENT DOCUMENTS

| | | | |
|---|---|---|---|
| 3,805,604 | 4/1974 | Ormond | 73/862.65 X |
| 3,949,603 | 4/1976 | Laimins | 177/211 X |
| 3,968,683 | 7/1976 | Ormond | 177/211 X |
| 3,994,161 | 11/1976 | Trozera | 177/211 X |
| 4,107,985 | 8/1978 | Sommer | 177/229 X |
| 4,138,882 | 2/1979 | Lockery et al. | 73/767 |
| 4,282,748 | 8/1981 | Lockery et al. | 73/862.66 |
| 4,342,217 | 8/1982 | Paetow | 73/1 B |
| 4,380,175 | 4/1983 | Griffen | 177/211 X |
| 4,453,609 | 6/1984 | Griffen et al. | 177/211 |
| 4,459,863 | 7/1984 | Nordström | 177/211 X |
| 4,556,115 | 12/1985 | Lockery et al. | 177/211 |
| 4,577,709 | 3/1986 | Shibahara et al. | 177/229 X |

Primary Examiner—E. A. Goldberg
Assistant Examiner—Patrick W. Foster
Attorney, Agent, or Firm—Roy F. Hollander

[57] ABSTRACT

Load cells incorporating one or more gaged beams as the load sensing elements are compensated for off-center loading in the longitudinal and/or lateral directions. The load cell may also include one or more flexure arms extending parallel to the beam. The relative position of the gages and the neutral axis of the beam is made such that the gages produce a correctible response to off-set loading by positioning the gages and/or physically altering the beam. Preferably, conventional or special strain gages are mounted upon the beam(s) to produce a correctible response by the gages by rotating and/or displacing them with respect to the longitudinal axis of the beam. Resistors are then connected to certain of the strain gages to compensate for off-center loading. The strain gages are advantageously placed all on one side of a beam but may be placed on opposite sides thereof.

17 Claims, 32 Drawing Figures

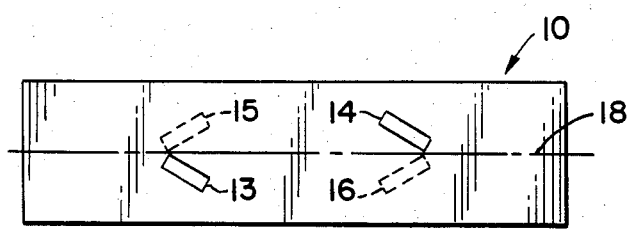
FIG.1
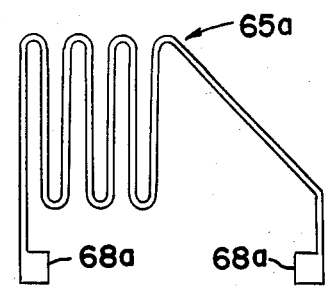
FIG.6A
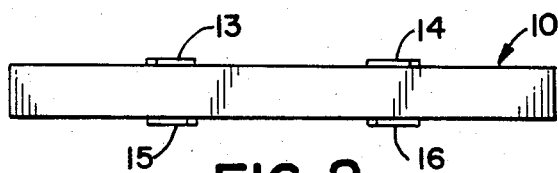
FIG.2
FIG.6B
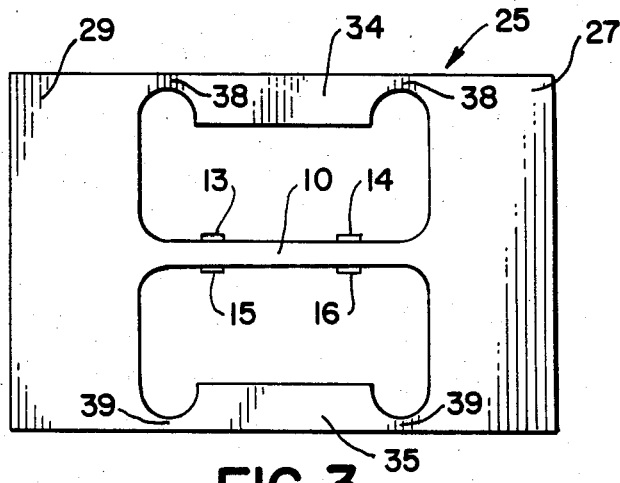
FIG.3
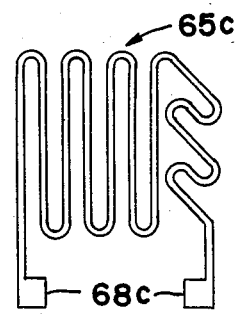
FIG.6C
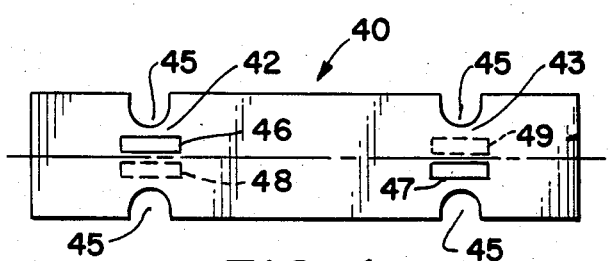
FIG.4
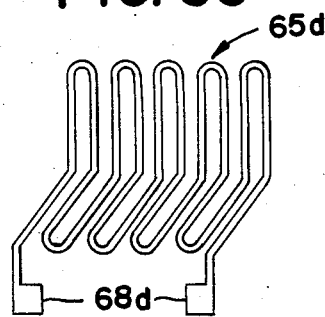
FIG.6D
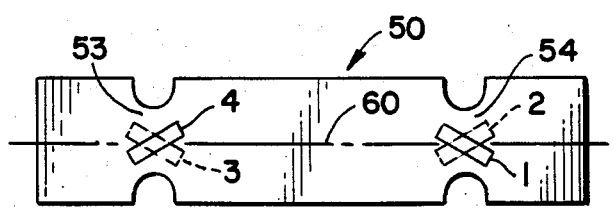
FIG.5
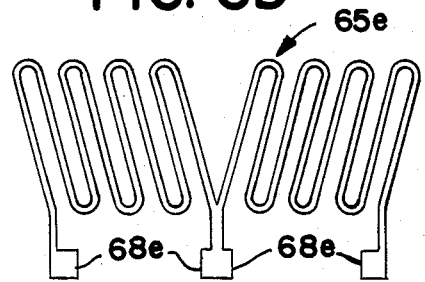
FIG.6E

LOAD CELL

This application is a continuation of application Ser. No. 579,488, filed Feb. 13, 1984 (now abandoned).

BACKGROUND OF THE INVENTION

1. Technical Field

The present invention relates to load cells having one or more gaged beams as the load sensing element and more particularly to such load cells which are compensated for displacement of the load and to methods of so compensating such load cells.

2. Background Art

In weighing mechanisms employing a load cell with one or more gaged beams, an item to be weighed is usually placed upon a platter or platform supported by one end of the beam or beams. It is well known that errors may arise if the weight is placed "off center", or other than in the central position it occupied during calibration of the weighing mechanism. Off-center loading may be longitudinal, along the central longitudinal axis of an elongated beam load cell, or lateral, along an axis perpendicular to the longitudinal axis, or both.

If the beams and other elements of a load cell were uniform and completely symmetrical, it would be theoretically possible for the weight to be placed at different positions on a platter supported by the load cell without affecting the response of the load cell. In practice, however, errors arise from placement of the load at different positions on the platter. The errors arise from slight variations in many factors. These include: (1) small variations in the positions of the strain gages on the beam(s); (2) variations in the bonding of the strain gages to the beam(s); (3) strain gage geometry variations; (4) strain gage resistance variations; (5) strain gage factor variations; (6) variations in load cell geometry; (7) variation in the thickness of any reduced sections of the beam(s); (8) variation in the location and/or geometry of any reduced sections; (9) variations in the compensation of the load cell beam(s); (10) variation in the strain in the load cell due to machining and other factors; and (11) variations in the lead in the lead wires to the connecting circuitry. Various ways have been suggested for compensating for the effects of off-center loading.

U.S. Pat. No. 3,576,128 to Lockery discloses a dual beam load cell compensated only for longitudinal displacement of the load by connecting resistors to the strain gages of the load cell. U.S. Pat. No. 4,128,001 to Marks discloses a dual beam load cell compensated for lateral and longitudinal displacement of the load by removing material from certain locations on the beams. U.S. application of Griffen, Ser. No. 272,928, filed June 12, 1981, now U.S. Pat. No. 4,380,175 discloses an improved arrangement for compensating for both longitudinal and lateral displacement for a dual beam load cell.

U.S. Pat. No. 4,282,748 to Lockery et al relates to a single beam load cell wherein the radius of a fillet between the load section and the mounting section is adjusted so that the load cell becomes substantially insensitive to inboard-outboard loading. Co-pending U.S. application Ser. No. 358,195 of Griffen and Behrman, now U.S. Pat. No. 4,453,609 discloses an improved single beam load cell compensated for longitudinal and lateral displacement of the load. The compensation may be accomplished by honing in reduced areas of the beam or by mounting the strain gages at angles to the longitudinal axis of the beam and connecting appropriate resistor networks to the strain gages.

U.S. Pat. No. 4,107,985 to Sommer discloses a single beam load cell between a pair of parallel flexure members. Material is removed from the beam by honing or filing between longitudinally spaced strain gages thereon to reduce the effects of off-center loading.

SUMMARY OF THE INVENTION

This invention relates to compensated load cells and to methods of compensating load cells in which one or more beam elements are employed to determine the magnitude of the load applied to the load cell. According to the invention, the positions of the strain gages with respect to the neutral axis of the beam on which they are mounted are made such that the gages produce a correctible output response to off-center loading. This may be accomplished by appropriate positioning of the gages on the beam and/or by changing the position of the neutral axis by removing material from appropriate portions of the beam. Preferably, the strain gages are mounted upon the beam or beams at angles to and/or displaced from the central longitudinal axis of the beam(s) to produce the correctible output response by the gages to off-center loading. Resistor networks are connected to certain of the strain gages to compensate for the off-center loading. The gages may advantageously be placed all on the same side of the beam for more convenient mounting and greater accessibility, but that is not necessary and they may be placed on opposite sides of the beam. The strain gages themselves may be specially constructed so that at least part of the path of the gage element is at an angle with respect to the remainder of the path. This allows the gages to be positioned more easily on a beam to provide a correctible response to off-center loads.

A load cell according to the present invention may comprise one or more beams with strain gages mounted on each beam and may also include one or more flexure arms generally parallel to the load beam(s) and extending between a load receiving member and a support base.

BRIEF DESCRIPTION OF THE DRAWINGS

FIG. 1 is a top view of an exemplary embodiment of a single beam of a load cell in accordance with this invention.

FIG. 2 is a side view of the beam of FIG. 1.

FIG. 3 is a side view of a load cell in accordance with this invention incorporating the single beam of FIGS. 1 and 2.

FIG. 4 is a top view of another exemplary embodiment of a single beam member according to this invention.

FIG. 5 is a top view of still another exemplary embodiment of a single beam member.

FIGS. 6A–6E are top views of exemplary configurations of strain gages which may be used in a load cell according to the present invention.

GENERAL DESCRIPTION

Figure 7:
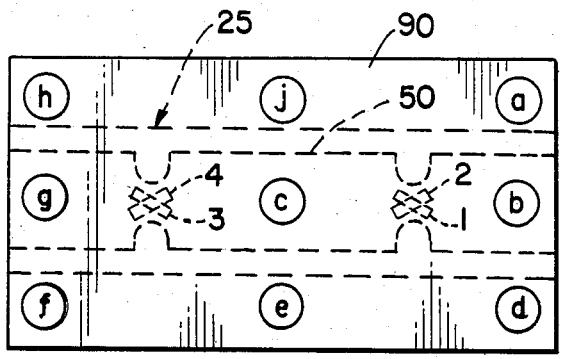
FIG. 7 is a top view of a scale utilizing a load cell with flexures as in FIG. 3 and which incorporates the single beam member of FIG. 5.

FIGS. 1 and 2 show one exemplary embodiment of a force responsive member of a load cell in accordance with the present invention. This force responsive member comprises a single flexure member or beam 10. As shown in FIGS. 1 and 2, this beam member 10 is of rectangular cross-section. It is not, however, essential that the cross-section be rectangular. It may of be of any other suitable shape or configuration. Beam 10 is arranged to be supported at one end while the force or load is applied to the other end. Strain gages 13 and 14 are applied to the top and gages 15 and 16 to the bottom of the beam at longitudinally spaced locations thereon to, when properly connected, provide a signal indicative of the load applied to the beam 10.

Typically, such strain gages have been placed on the beam surfaces so that, ideally, the gages are sensitive to strains produced by the vertical components of the applied load and insensitive to strains resulting from torques on the beam induced by changes in the position of the weight. Gages that are perfectly placed on the beam for these purposes are said to lie on the neutral axis of the beam. For an ideal bending beam with the configuration of beam 10, the neutral axis is on or along the central longitudinal axis on the surface of the beam.

In practice, however, beams are not ideal and the neutral axis is not exactly along the central longitudinal axis of the beam, and usually cannot be precisely located. Gages are positioned symmetrically on the longitudinal axis as being the best determinable location but are sensitive to torques caused by off-center loads so that further compensation of the load cell is required. This compensation has usually been provided by honing certain parts of the beams or associated structures.

In accordance with this invention, it has been discovered that it is possible to better compensate for off-center loading of a scale arrangement incorporating one or more beams as the load sensing element by connecting resistor networks to the strain gages if the position of the gages with respect to the neutral axis of the beam is made such that the gages produce a correctible response to off-center loading. The correctible response may be obtained by appropriately positioning the gages and/or by physically altering the beam to displace the neutral axis. In either case, the object is to introduce a lack of symmetry to cause the gages to produce a response to off-set loading that is correctible by connecting resistors in circuit with one or more of the gages. It is preferred that the correctible response to offset loading be obtained by displacing and/or rotating at least some of the gages with respect to the central longitudinal axis (as the best determinable representation of the neutral axis) of the beam. For example, the gages may be placed on the beam so that at least a portion of the path of the gage element is at a slight angle to the central longitudinal axis on the surface of the beam.

In accordance with the present invention, strain gages 13–16 in FIGS. 1 and 2 are positioned at an angle to the longitudinal axis 18 of beam 10 and are displaced slightly therefrom. Gages 13 and 15 are positioned on opposite surfaces at one end of beam 10 and are rotated and displaced in opposite directions from each other. Similarly, gages 14 and 16 are applied to the opposite end of beam 10. The gages are so placed in order to be sensitive to off-center loading of beam 10. Compensation for errors caused by displacement of the load may be obtained by connecting resistors to one or more of the gages as described below.

FIG. 3 shows a load cell structure 25, at a smaller scale than FIGS. 1 and 2, in which the single beam 10 of FIGS. 1 and 2 is rigidly connected between a load receiving arm 27 and a base 29. Beam 10 may be connected between arm 27 and base 29 by means of adhesive, welding or in any other suitable manner which will cause it to be rigidly connected between arm 27 and base 29. Beam 10 may also be an integral part of the load cell structure including arm 27 and base 29. As in FIGS. 1 and 2, beam 10 is provided with strain gages 13–16 for sensing tensile and compressive strains produced in beam 10 by loads or weights applied to load receiving arm 27. A pair of flexure arms 34 and 35 are also interconnected between load receiving arm 27 and base 29 substantially parallel to beam 10. As shown in FIG. 3, each arm 34, 35 includes flexure portions 38, 39 respectively. Such flexure portions are not necessary, however, and the load cell will function satisfactorily without them. Arms 34, 35 assist in preventing off-center loads on load receiving arm 27 from affecting beam 10 in an undesired way. While two flexure arms 34 and 35 are shown in the load cell of FIG. 3, a single flexure arm or more than two flexure arms may be employed in the load cell with analagous effects to the use of the two flexure arms.

The load cell 25 of FIG. 3 with one or more flexure arms is affected by displacement of the load longitudinally or laterally off-center from load receiving arm 27. Compensation for such off-center loading may be obtained with the load cell of FIG. 3 by positioning of the strain gages 13-16 as described above and connection of compensating resistors to one or more of the gages as described below.

FIG. 4 shows another exemplary embodiment of a single beam force responsive member of the load cell in accordance with the present invention. This beam 40 may, in the same manner as beam 10 of FIGS. 1 and 2, be used as the force responsive member of the load cell structure 25 of FIG. 3. As shown in FIG. 4, beam 40 has two reduced sections 42 and 43, one near each of its ends. These reduced sections are formed by notches 45 cut into the edges of the beam. In order to promote correction for both longitudinal and lateral off-center loading by the addition of compensating resistors, strain gages 46-49 are displaced from the center line of beam 40.

Referring now to FIG. 5, the beam 50 shown there may be used as the force responsive member of the load cell 25 of FIG. 3 in the same manner as described above in connection with beams 10 and 40. As shown in FIG. 5, strain gages 1 through 4 are applied to beam 50 at or near the reduced sections 63, 64. The reduced sections, while not essential, are usually provided since they improve the performance of the load cell. Gages 1 and 4 are applied to the top side of beam 50 while gages 2 and 3 are applied to the bottom side.

As shown in FIG. 5, the entire gages 1-4 and all of the gage elements are at an angle to the central longitudinal axis 60 of beam 50. The angle may be up to 10 or more degrees from the longitudinal axis. In accordance with the exemplary embodiment described herein, this angle is preferably of the order of 5°. As shown in FIG. 5, the angle is formed by rotating strain gage 1 counterclockwise when applied to beam 50 while the angle is clockwise when gage 4 is applied to the beam. Similarly, gages 2 and 3 are applied to the underside of the beam by rotating the gages opposite to the corresponding gages on the top side of the beam. Although all of gages 1-4 are shown rotated, this is not strictly necessary and significant correction for off-center loading can be obtained with only one tension sensing gage and one compression sensing gage rotated. Further, two or more of the gages may be displaced from the longitudinal axis 60 rather than, or in addition to, being rotated and the same general effect will be obtained. Adjacent gages should be displaced in opposite lateral directions.

It has also been found that, rather than rotating and/or displacing conventional gages, strain gages of special construction, examples of which are shown at 65a to 65e in FIG. 6, may be utilized. In the gages of FIG. 6, at least a portion of the undulating path of the gage elements is at an angle to and/or displaced from the overall orientation of the gages as determined by the respective connection tabs 68a to 68e. The gages 65a to 65e are exemplary only and it will be appreciated that any gage having at least a portion of the path of its gage element at an angle to and/or displaced from the remainder of the path may be utilized. Certain patterns will, of course, be of more advantage than others depending upon the degree of offset correction needed. The special gages will usually be mounted on a beam such as beam 50 so as to be generally symmetrical about the longitudinal axis of the beam. The gages may, however, be displaced and/or rotated with respect to the longitudinal axis of the beam. In the descriptions which follow, reference to rotation and/or displacement of strain gages is intended to include the use of gages such as exemplified in FIG. 6 as well as rotation and/or displacement of complete conventional gages.

When the beam of FIGS. 1, 2, 4 or 5 or the load cell 25 of FIG. 3 incorporating a single beam with rotated and/or displaced gages is incorporated in a scale, compensation for off-center loading may be obtained by connecting resistor networks to one or more of the strain gages. As an example, FIG. 7 shows load cell 25 supporting a scale platter 90. Load cell 25 incorporates single beam 50 with strain gages 1 to 4 rotated with respect to central longitudinal axis 60. The value of resistors to be connected to one or more of the gages 1 to 4 to effect compensation may be determined in accordance with the procedures disclosed in U.S. Pat. No. 4,380,175 to Griffen.

Figure 8:
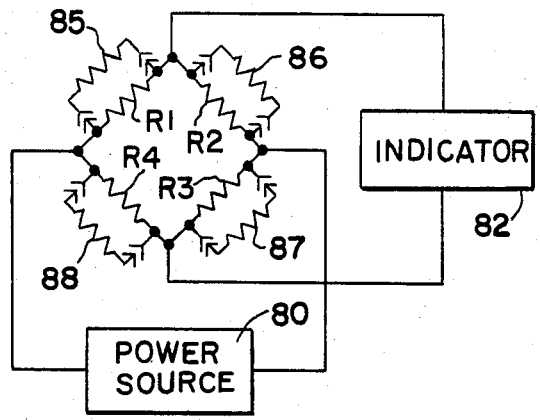
FIG. 8 shows a suitable electrical bridge arrangement for interconnecting the strain gages and for connecting compensating resistor networks to the strain gages in a load cell such as that of FIG. 7.

After the load cell has been constructed and assembled as described above, the resistances ($R_1$, $R_2$, $R_3$ and $R_4$) of the strain edges are connected in a bridge circuit as shown in FIG. 8 so that the adjacent pairs of gages 1, 2; 2, 3; 3, 4; and 4, 1 on the load cell structure are electrically adjacent in the bridge circuit. One pair of bridge terminals is connected to power source 80 and the other pair of bridge terminals is connected to an indicator 82. The indicator may be calibrated in any desired units, but for convenience, the units will be referred to herein as counts. After the bridge circuit has been connected as described, a test weight is then applied to the scale and the output of the bridge circuit is determined. At this time the compensating resistors 85, 86, 87 and 88 are not connected. As shown in the drawing, single compensating resistors are connected to the strain gages. However, any suitable type of resistor network may be employed including series resistors, parallel resistors or combinations of series and parallel resistors.

One method of determining the value of a resistor to compensate for longitudinal errors is to connect two similar variable resistors to the strain gages at one end or the other of the load cell. These resistors are simultaneously varied while the test weight is moved along the longitudinal axis until the output of the bridge is substantially constant for all positions of the test weight along the longitudinal axis. Similarly, two variable resistors are connected to the strain gages on either the top or bottom of the load cell and these varied as the test weight is moved laterally to different positions until the lateral movement of the test weight does not produce any variation in output of the bridge. This arrangement is satisfactory if correction is desired in only one direction, either longitudinal or transverse. However, there is an interaction between the transverse and longitudinal shift compensations if corrected independently. Whenever one compensation is made, it will change the amount of compensation required for shift of the other type. Thus, numerous corrections must be made in an iterative manner until the shift specifications are met. This approach is slow and costly.

A more direct method of determining the value of the resistor networks to be applied to the various strain gages is to apply a test weight at the corners of the scale platter at positions a, d, f and h as shown in FIG. 7. With a test weight at each of these positions, a pair of test resistors is connected to each of the pairs of adjacent strain gages and the output of the indicator determines the desired resistances. In the exemplary embodiment of the invention, for strain gages having a resistance of approximately 350 ohms, the value of suitable test resistors has been found to be approximately 4,000 ohms. Thus, while a test weight is in position a, the two test resistors are connected first to the strain gages 1 and 2, second to strain gages 2 and 3, next to 3 and 4, and finally to 4 and 1. The output of the indicator in each of these instances is employed as described. Next, the test weight is moved to position d and the above procedure repeated. It is then repeated with the test weight in positions f and h. From these test results, it is possible to calculate the desired compensating resistors which will accommodate displacement of the load or weight on the scale, both in the longitudinal direction and the lateral direction, if desired. The displacement may be corrected for only one of these directions when desired.

The effects of connecting resistors of different values in parallel with the strain gages may be calculated in the following manner. The output of a single strain gage is often expressed as $(\Delta G/G)$ where G is the resistance of the strain gage. If a shunt resistor of S ohms is connected across the strain gage, the output is reduced to A $(\Delta G/G)$ where A is an attenuation constant having a value between 0 and 1 and is approximately equal to $A = S/(S+G)$. Now, the output of a strain gage bridge may be expressed as $\Delta E/V$ where $\Delta E$ is the change in output and V is the applied voltage. Thus, for a load at the center c (FIG. 7) of the scale platform:

$$\left(\frac{\Delta E}{V}\right)_c = \frac{1}{4}\left(\frac{\Delta G_1}{G_1} - \frac{\Delta G_2}{G_2} + \frac{\Delta G_3}{G_3} - \frac{\Delta G_4}{G_4}\right) \quad (1)$$

Now, if the load is shifted to position e on the platform the output of the bridge becomes $$\left(\frac{\Delta E}{V}\right)_e = \quad (2)$$

$$\frac{1}{4}\left(\frac{\Delta G_1 + r_1}{G_1} - \frac{\Delta G_2 + r_2}{G_2} + \frac{\Delta G_3 + r_3}{G_3} - \frac{\Delta G_4 + r_4}{G_4}\right)$$

where $r_1$, $r_2$, $r_3$, and $r_4$ represent the change in the output of the respective strain gages due to shifting of the load from c to e. Subtracting equation (1) from equation (2):

$$\left(\frac{\Delta E}{V}\right)_e - \left(\frac{\Delta E}{V}\right)_c = \frac{1}{4}\left(\frac{r_1}{G_1} - \frac{r_2}{G_2} + \frac{r_3}{G_3} - \frac{r_4}{G_4}\right) \quad (3)$$

Now connecting a test shunt resistor S across strain gages 1 and 2 and with the load at c $$\left(\frac{\Delta E}{V}\right)_{cS} = \quad (4)$$

$$\frac{1}{4}\left(A_T\left(\frac{\Delta G_1}{G_1}\right) - A_T\left(\frac{\Delta G_2}{G_2}\right) + \frac{\Delta G_3}{G_3} - \frac{\Delta G_4}{G_4}\right)$$

where $A_T$ is the attenuation produced by the test shunt resistor. With the load now shifted to e $$\left(\frac{\Delta E}{V}\right)_{eS} = \frac{1}{4}\left(A_T\left(\frac{\Delta G_1 + r_1}{G_1}\right) - \quad (5)\right.$$

$$\left. A_T\left(\frac{\Delta G_2 + r_2}{G_2}\right) + \frac{\Delta G_3 + r_3}{G_3} - \frac{\Delta G_4 + r_4}{G_4}\right)$$

Now subtracting equation (4) from (5)

$$\left(\frac{\Delta E}{V}\right)_{eS} - \left(\frac{\Delta E}{V}\right)_{cS} = \quad (6)$$

$$\frac{1}{4}\left(A_T\frac{r_1}{G_1} - A_T\frac{r_2}{G_2} + \frac{r_3}{G_3} - \frac{r_4}{G_4}\right)$$

Subtracting equation (6) from (3)

$$\frac{1}{4}\left(\frac{r_1}{G_1} - A_T\frac{r_1}{G_1} - \frac{r_2}{G_2} + A_T\frac{r_2}{G_2}\right) = \quad (7)$$

$$\frac{1}{4}\left((1 - A_T)\frac{r_1}{G_1} - (1 - A_T)\frac{r_2}{G_2}\right) =$$

$$\frac{1}{4}(1 - A_T)\left(\frac{r_1}{G_1} - \frac{r_2}{G_2}\right)$$

Assume, for example that a 4,000 ohm shunt resistor across gages 1 and 2 reduces the shifting error (position c to position e, FIG. 7) from 54 units to 34. To more fully correct for the shifting error and obtain a corresponding final attenuation $A_F$ and value of shunt resistor to produce the correction, it follows from (7)

$$\frac{1 - A_T}{1 - A_F} = \frac{54 - 34}{54 - 0} = \frac{20}{54} \quad (8)$$

but $$A_T = \frac{4000}{4000 + 350} = 0.9195$$

so the final A should be $A_F = 0.783$.

Alternatively, the midpoint between the test values for the test shunt across gages 1 and 2 and the test value of 65 with the shunt across gages 3 and 4 may be used instead of the test value obtained with no shunt resistors connected to the bridge.

Thus:

$$\frac{1 - A_T}{1 - A_F} = \frac{\frac{1}{2}(65 + 34) - 34}{\frac{1}{1}(65 + 34) - 0} = \frac{49.5 - 34}{49.5} = \frac{15.5}{49.5} \quad (8a)$$

and $A_F = 0.743$ and $S = 1012$ ohms. This method usually gives a better approximation of the desired value of the shunt resistor.

The example above involved compensation for transverse shift only, that is, from point C toward point e (or point j) in FIG. 7. If it is desired to compensate for longitudinal shift only, that is, from point c to point b, the above procedure may be followed. The values obtained with the test shunt resistors across either strain gages 2 and 3 or 1 and 4 or across both pairs would be used in this instance.

There is an interaction between the transverse and longitudinal shift compensations. If corrected independently, when one compensation is made it will change the amount of compensation required for shift of the other type. Thus, numerous corrections would have to be made in an interative manner until the shift specifications are met. This approach is slow and costly.

In accordance with an aspect of the present invention, equations are written representing both the required longitudinal and transverse corrections. The constants are determined by tests and then the desired amount of correction or compensation is determined.

For example, let $$Y = Ay + Bx + E$$

and $$X = Cy + Dx + F \tag{9}$$

where:
y is the change in indicated weight observed when the applied load is shifted in one direction, identified as the y direction, and is a function of the values of the test compensating resistors;
x is the change in indicated weight observed when the applied load is shifted in a direction substantially orthogonal to the y direction and identified as the x direction, and is a function of the values of the test compensating resistors;
Y is the change in load shift error resulting from the addition of compensating resistors to either opposite pair of adjacent strain gages, for example gages 2,3 or 4,1 in FIGS. 7 and 8;
X is the change in load shift error resulting from the addition of compensating resistors to either opposite pair of adjacent gages not used in determining Y, for example gages 1,2 or 3,4; and
A, B, C, D, E and F are constants.

As defined above, the values of X and Y are substantially independent of each other. The units of Y, X, y, and x are increments of weight or, more specifically as used in the examples, counts. Also, it should be noted that the x and y directions do not necessarily correspond to transverse and longitudinal directions on platform 90.

One way to determine the constants in equation (9) is to place a test weight on platform 90 in different positions with test compensating resistors connected to different pairs of strain gages and utilize the output indications from indicator 82. One procedure utilizes data from placing the test weight at positions b, e, g and j or at positions a, d, f and h, as shown in FIG. 7, with test compensating resistors connected to the various pairs of strain gages. Table I below shows one set of such data where the test compensating shunt resistors S is again 4000 ohms.

TABLE I

| Position | $R_1,R_2$ | $R_2,R_3$ | $R_3,R_4$ | $R_4,R_1$ |
|---|---|---|---|---|
| g | 26555 | 26549 | 26515 | 26618 |
| b | 26521 | 26466 | 26511 | 26664 |
| e | 26005 | 26167 | 26355 | 26290 |
| j | 27091 | 26863 | 26685 | 27012 |
| g-b = $x_n$ | 34 | 83 | 4 | −46 |
| e-j = $y_n$ | −1086 | −696 | −330 | −722 |

In Table I, the differences between the readings at opposite sides (g,b and e,j in FIG. 7) of platform 90 are determined and recorded as x and y values with test compensting resistors in place across the respective sets of strain gages. Readings need not be taken without test compensating resistors in place so that there is not a "No R" column in Table I. The "No R" points are determined from Table I as will become apparent below.

Figure 9:
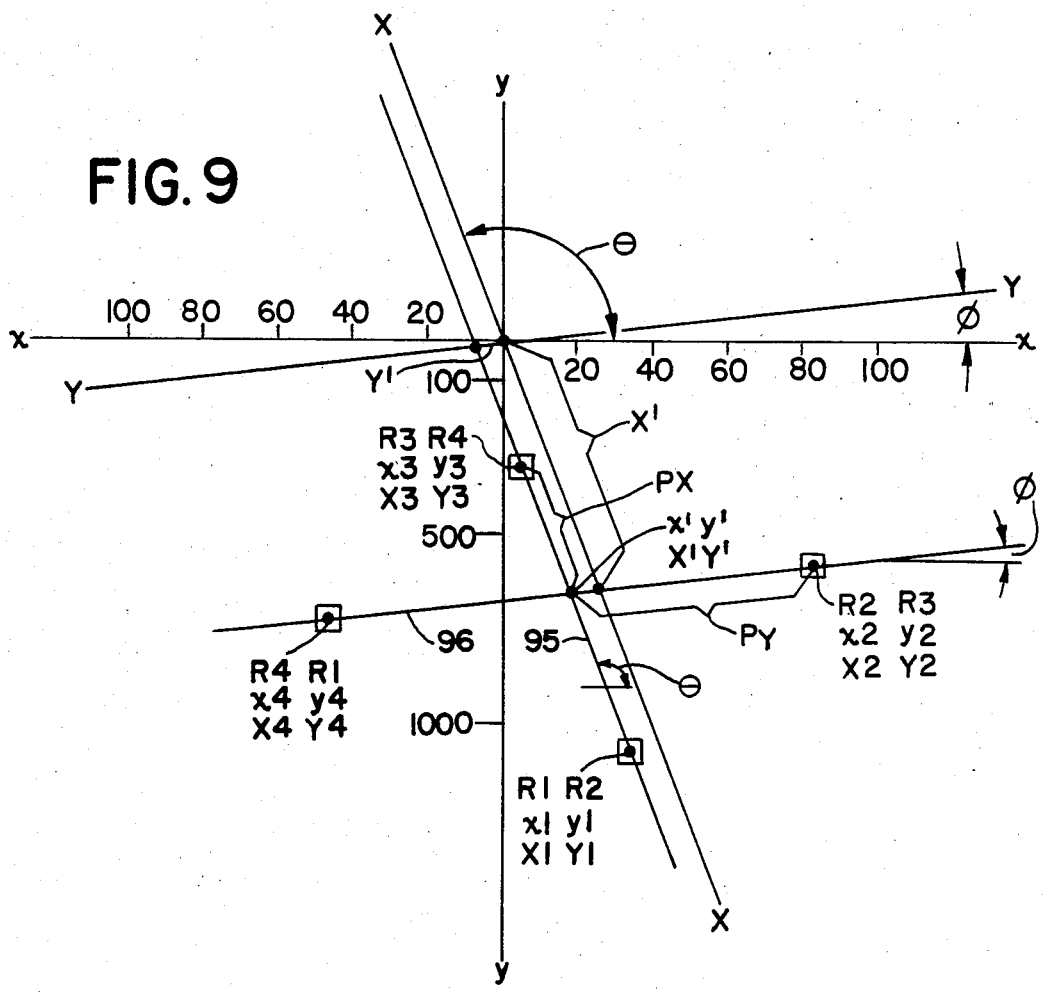
FIG. 9 is a graph illustrating the effect of connecting compensating resistors to the strain gages.
Figure 10A:
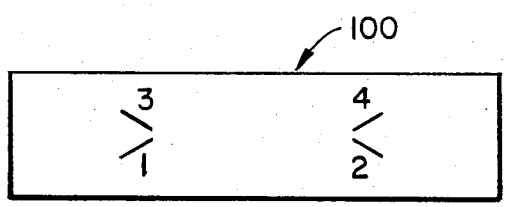
FIGS. 10A–10F are diagramatic top views of a single beam member illustrating exemplary placements of strain gages on the same surface of the beam to be responsive to off-center loading.
Figure 10D:
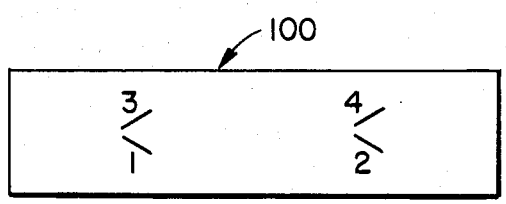
Figure 10B:
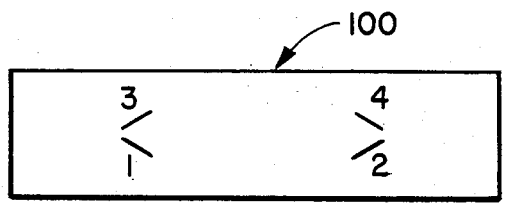
Figure 10E:
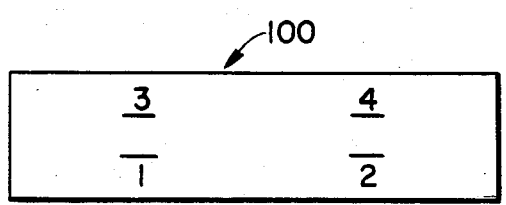
Figure 10C:
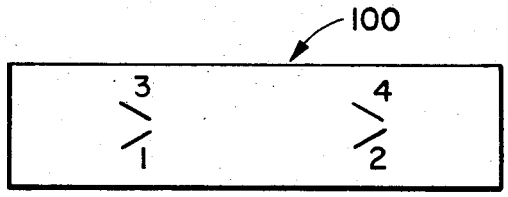
Figure 10F:
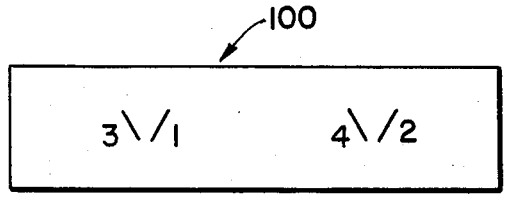

If the data from Table I are plotted on an x-y axis as shown in FIG. 9, one line 95 can be drawn through the points for $R_1R_2$ and $R_3R_4$ and another line 96 intersecting the first through the points for $R_2R_3$ and $R_4R_1$. The lower the value of the test compensating shunt resistors S connected to the strain gages, the further the plotted points are from the intersection of the lines. The intersection is close to the uncompensated or "No R" point for load shift in either or both of the x and y directions. Changes in shift produced by placing shunt resistors across a pair of strain gages is represented by movement along the proper line. Increasing values of shunt resistors move the point along the line toward the intersection while decreasing values move it away from the intersection.

Since the origin of the x,y axis represents the point of zero load shift error and the point x',y' represents the load shift error without compensation, complete compensation for load shift can be obtained by placing the appropriate compensating resistance values across the appropriate strain gages such that the point x',y' is made to coincide with the origin of the x,y axis. In accordance with the present invention the proper values of compensating resistances to accomplish this may be determined mathematically using FIG. 9 and Table I. First, the x,y axes are rotated to define X,Y axes parallel to the respective intersecting lines 96, 96. The X and Y coordinates (X',Y') of the point x',y' can then be determined to obtain the appropriate values of compensating resistors required.

The relationship of the x,y axes to the X,Y axes is given by $$y = Y \sin \phi + X \sin \theta, \text{ and}$$

$$x = Y \cos \phi + X \cos \theta \tag{10}$$

where $\phi$ and $\theta$ are the angles shown in FIG. 9. Solving for Y and X yields $$Y = \frac{\cos \theta}{\sin (\phi - \theta)} y - \frac{\sin \theta}{\sin (\phi - \theta)} x \tag{11}$$

$$X = \frac{\cos \phi}{\sin (\phi - \theta)} y + \frac{\sin \phi}{\sin (\phi - \theta)} x$$

Solving for the coordinates X',Y' of the point x',y' in the X,Y coordinate system $$Y' = \frac{\cos \theta}{\sin (\phi - \theta)} y' - \frac{\sin \theta}{\sin (\phi - \theta)} x'$$

$$X' = \frac{\cos \phi}{\sin (\phi - \theta)} y' + \frac{\sin \phi}{\sin (\phi - \theta)} x'$$

where y' and x' are, as previously defined, the intersection coordinates of the lines 95,96.

y' = −709.0
and
x' = 19.04
Now solving for Y' and X'

Y′ = −9.17
and
X′ = −707.79
from FIG. 9 and Table I.

The slope of each line is the tangent of the angle of inclination to the x-axis:

| | | | |
|---|---|---|---|
| tan $\phi$ = | 0.2016 | tan $\theta$ = | −25.20 |
| $\phi$ = | 11.40° | $\theta$ = | 92.27° |
| sin $\phi$ = | 0.1977 | sin $\theta$ = | 0.9992 |
| cos $\phi$ = | 0.9803 | cos $\theta$ = | −0.0396 |
| | | sin ($\phi$ − $\theta$) = | −0.9873 |

From this point the calculated values X′ and Y′ are utilized with the actual change caused by the test shunt resistors to determine the size of the needed final compensating resistors.

The next step is to find $A_{FY}$, the final attenuation term for changes in Y direction. From this the final trim resistors $S_{FH}$ can be calculated. As in equation (8), a ratio is formed $$\frac{1 - A_{TY}}{1 - A_{FY}} = \frac{P_Y}{Y'}$$

where $P_Y$ is the weight change between the weight represented by the point x′,y′ (or X′,Y′) and the weight represented by the coordinates of the test reading on line 96 in the direction of the needed correction. This weight change is represented in FIG. 9 by the distance along line 96 from x′,y′ to x₂,y₂. In this example, from Table I and FIG. 9

$$P_Y = \sqrt{(-696 + 709)^2 + (83 - 19.04)^2} = 65.27$$

Also from equation (8), with a test resistance of 4000 ohms, $A_{TY}$=0.9195 and $1 - A_{TY}$=0.0805. Then $$\frac{0.0805}{1 - A_{FY}} = \frac{65.27}{9.17}$$

$$A_{FY} = 0.9887 = \frac{S_{FY}}{S_{FY} + G}, \text{ and } G = 355 \text{ ohms}$$

$S_{FY}$=31,060 ohms.
Similarly for $A_{FX}$ $$\frac{1 - A_{TX}}{1 - A_{FX}} = \frac{P_X}{X'}$$

$P_X$ is represented in FIG. 9 by the distance along line 95 from x′,y′ to x₃,y₃.

$$P_X = \sqrt{(-330 + 709)^2 + (4 - 19.04)^2} = 379.30$$

$1 - A_{TX} = 0.0805$ $$\frac{0.0805}{1 - A_{FX}} = \frac{P_X}{X'} = \frac{379.3}{707.79}$$

$A_{FX}$=0.8498
$S_{FX}$=2009 ohms.

Thus, a 2009 ohm resistor should be placed across gage 4, and a 31,060 ohm resistor placed across gage 2. Combining $S_{FX}$ and $S_{FY}$ in $$\frac{S_{FX} \cdot S_{FY}}{S_{FX} + S_{FY}}$$

gives a resistor of 1887 ohms to be placed across gage 3.

Thus, the error due to shifting of the weight on the scale platform may be reduced to a very small value.

As mentioned above, the test and final resistor networks connected to the strain gages may include series resistors rather than shunt resistors as in the exemplary embodiment described. In that case the attenuation factor A for a series resistor connected to the strain gage must be used instead of that for a shunt resistor. The attenuation factor for the series resistor is A=G/(G+T) where G is the resistance of the strain gage and T is the resistance of the series resistor. Except for using series resistors and the attenuation factor A for the series resistors, the procedure and calculations for compensating for load shifts are the same as those described above.

In FIG. 10 there is shown diagrammatically a single beam or force responsive member 100 with strain gages 1, 2, 3, 4 all mounted on the same surface of the beam and displaced and/or rotated in various exemplary ways with respect to the central longitudinal axis of the beam 100. While the gages 1–4 are shown all mounted on the upper surface of beam 100 they may as well be mounted on the lower surface. The gages 1–4 are again oriented or placed with respect to the longitudinal axis of beam 100 to produce a correctible response by the gages to off-center loading. There is advantage in having all of the gages on the same surface of the beam in the convenience of mounting the gages on the beam and in the connection of compensating resistors to the gages. As in the previous cases, it is not absolutely necessary that all of the gages be displaced or rotated or present since some effect will be obtained with only two of the gages present or so oriented. It is preferred, however, that all the gages be oriented so as to produce a more correctible response to off-center loading.

Also, the strain gages 1–4 on beam 100 may be gages of conventional design or may be gages of special pattern or construction exemplified in FIG. 6 and described above. Beam 100 with gages 1–4 may be used alone as a load cell or may be used as the single beam force responsive member in the load cell 25 of FIG. 3.

The beam 100 of FIG. 10 with all the strain gages mounted on one surface can be compensated for off-center loading, lateral or longitudinal or both, by connecting appropriate resistor networks to one or more of the gages. Appropriate resistor networks for such correction are determined in accordance with the same procedures as described above in connection with FIGS. 5 to 9. When the strain gages 1–4 are connected in a suitable bridge arrangement, test series and/or shunt resistors are connected in circuit with certain of the gages and readings taken with a weight positioned at longitudinally and laterally spaced locations on a scale platform and entered into a table such as Table 1 above. The data thus taken may then be used in the manner described above to determine appropriate resistor networks to be connected to certain of the gages to compensate for lateral and/or longitudinal off-center loading on the scale platform.

Figure 12:
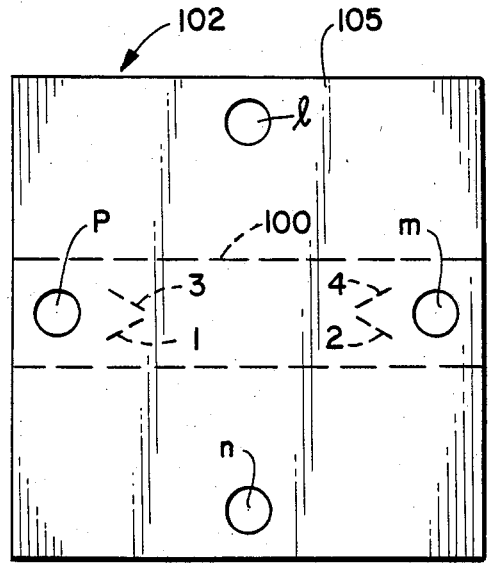
FIG. 12 is a top or plan view of a scale utilizing a load cell which incorporates the single beam member of FIG. 10A illustrating the placement of test weights off-center on the scale platform.

As an example, the appropriate resistor networks suitable for compensation of the scale 102 of FIG. 12 including beam 100 with gages 1–4 oriented as in FIG.

10A will be described. Gages 1–4 are arranged in the bridge circuit 103 of FIG. 11 with tension gages 1 and 3 in opposite legs of the bridge and compression gages 2 and 4 in the other opposite legs of the bridge. With test compensating resistors S1 to S6 connected to certain of the gages a weight is placed at each of positions l, m, n and p on platter 105 of scale 102 and the output of bridge circuit 103 determined from an indicator (not shown) to obtain the data of Table II below.

TABLE II

|  | S2S3 | S4S1 | S5S3 | S6S4 |
|---|---|---|---|---|
| POSITION l | 14845 | 14112 | −36310 | 64993 |
| POSITION m | 14873 | 14286 | −36924 | 65816 |
| POSITION n | 14887 | 14152 | −37645 | 66423 |
| POSITION p | 14867 | 13986 | −37071 | 65660 |
| POS'S l - n | 42 | 40 | −1335 | 1430 |
| POS'S p - m | −6 | −300 | −147 | −156 |

In obtaining the data in Table II, different combinations of shunt test compensating resistors S1 to S4 and series test compensating resistors S5 and S6 were used. Series compensating resistors S5 and S6 are placed in circuit by opening shorting switches 107, 108, respectively. The value of the test compensating resistors is not critical and is nominally near ten times the gage resistance for the shunt resistors. The test series compensating resistors may be about one-tenth of the gage resistance. In this particular example, the gage resistance was 350 ohms, each shunt test compensating resistor had a value of 2500 ohms and each test series resistor had a value of 50 ohms. Each series of readings at the positions indicated in FIG. 12 were taken with only a pair of the test compensating resistors actually connected in the circuit with the respective strain gages. in each case the two compensating resistors actually connected to the respective strain gages must be selected so as to maintain the balance of the bridge. In the data of the first column of Table II, shunt resistors S2 and S3 were connected, and so on with the heading of each column of Table II identifying the pair of test compensating resistors used in taking that particular set of data. Many configurations of strain gage bridge and test compensating resistors in addition to that of FIG. 11 could be used to obtain data analogous to that of Table II.

The data from Table II is then used in a manner analogous to the data from Table I as described above. The data from Table II are used in an x-y coordinate system to determine the line defined by the points S2, S3 and S4, S1 and the line determined by the points S5, S3 and S6, S4 as was done in connection with FIG. 9 above. Following the procedure above, the intersection coordinates of the lines are determined as Y' = −151.53
x' = 41.01

Now from the plot analogous to FIG. 9 and the data in Table II the following values can be obtained,

| tan φ = | 147 | tan θ = | −3.2550 × 10⁻³ |
|---|---|---|---|
| φ = | 89.61 deg's | θ = | −.186497 deg's |
| sin φ = | 1.0000 | sin θ = | −3.255 × 10⁻³ |
| cos φ = | 6.8000 × 10⁻³ | cos θ = | 1.0000 |
| sin (φ − θ) = | .99999 | | | the values Y' and X' are then calculated as $$Y' = \frac{\cos \theta}{\sin(\phi - \theta)} y' - \frac{\sin \theta}{\sin(\phi - \theta)} x'$$

$$= \frac{1.0000 \times (-151.53)}{.99999} - \frac{3.255 \times 10^{-3} \times 41.01}{.99999}$$

$$= -151.40 \text{ counts}$$

$$X' = -\frac{\cos \phi}{\sin(\phi - \theta)} y' - \frac{\sin \phi}{\sin(\phi - \theta)} x'$$

$$= \frac{-6.8000 \times 10^{-3} \times (-151.53)}{.99999} - \frac{1 \times 41.01}{.99999}$$

$$= 42.04 \text{ counts}$$

Following the procedure described above, the next step is to find the test attenuation factors. For a 2500 ohm shunt resistor, the attenuation factor is $$ATY = \frac{S}{S + G} = \frac{2500}{2500 + 355} = .8757 = ATX$$

For a 50 ohm series resistor, the attenuation factor is $$AT = \frac{G}{G + T} = \frac{355}{355 + 50} = .8765 \text{ (Series Resistor)}$$

The test attenuation factor for the series and shunt resistors are nearly equal. It will be assumed to be equal in the following calculations (=0.876).

$$\frac{1 - ATY}{1 - AFY} = \frac{151 - 6}{151.40} = .9577$$

$$1 - AFY = .8705$$

$$S2 = \frac{GA}{1 - A} = \frac{355(.8705)}{.1295} = 2386 \text{ Ohms}$$

and the final value of shunt resistor S2 to be placed permanently across gage 2 is 2386 ohms. Similarly $$\frac{1 - ATX}{1 - AFX} = \frac{1335 + 41}{42.04} = 32.73$$

$$1 - AFX = (1 - .876)/32.73 \; 3.789 \times 10^{-3}$$

$$AFX = .9962$$

$$S5 = \frac{G(1 - A)}{A} = \frac{355(1 - .9962)}{.9962} = 1.354 \text{ Ohms}$$

and the final value of series resistor S5 to be placed in series with gage 1 is 1.354 ohms. Since gage 3 is common in the solutions chosen, a final value of shunt resistor S3 should be determined and placed across gage 3. The value can be determined from the attenuation factors.

$$A = (AXF) \times (AYF) = .9962 \times .8705 = .8672$$

$$S3 = \frac{GA}{1 - A} = \frac{355(.8672)}{1 - .8672} = 2318 \text{ Ohms}$$

Figure 13:
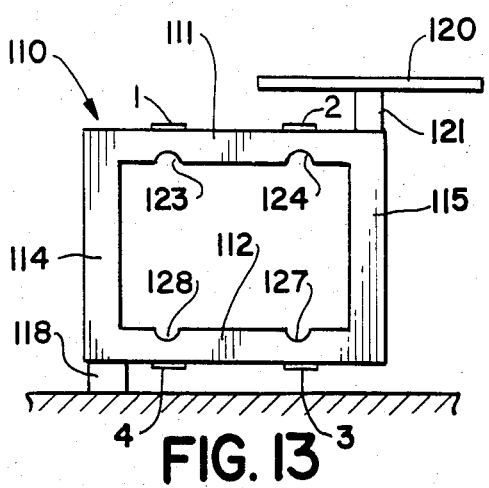
FIG. 13 is a side view of a weighing mechanism incorporating a dual beam load cell in accordance with this invention.
Figure 14:
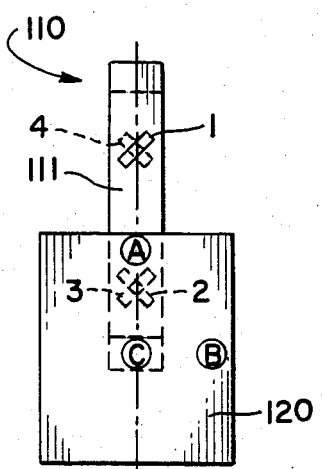
FIG. 14 is a top view of the weighing mechanism of FIG. 13.

FIGS. 13 and 14 show a dual beam load cell 110, that is, a load cell having two flexure beams 111 and 112, each of which is provided with strain gages. The left-hand ends (as viewed in FIG. 13) of beams 111, 112 are connected by a vertical member 114 and the right hand ends by a vertical member 115. Members 114 and 115 are preferably integral with beam members 111 and 112 but if they are not so formed, they are rigidly interconnected with members 111 and 112.

Load cell 110 is supported at one end by a support member 118 and in turn supports a load receiving platform 120 through a member 121. Upper flexure beam 111 has two reduced sections 123 and 124 and lower beam 112 has similar reduced sections 127 and 128. Strain gages 1 and 2 are mounted on the upper surface of beam 111 adjacent reduced sections 123, 124, respectively while strain gages 3 and 4 are mounted on the bottom surface of lower beam 112 adjacent reduced sections 127, 128. As with the embodiments of this invention previously described, the reduced sections 123, 124 and 127, 128 are not required but are often provided since they tend to improve the performance of the load cell.

As shown in FIG. 14, gages 1 to 4 are positioned on beams 111, 112 to be sensitive to an off-center load on platter 120 so that, as described above, load cell 110 can be more easily compensated for the effects of such off-center loading. In particular, gages 1 and 2 are positioned at opposite small angles to the longitudinal axis of beam 111 while gages 3 and 4 are so positioned on lower beam 112. Also, the vertically spaced pairs of gages 1, 4 and 2, 3 are positioned at opposite angles with respect to each other. As in the cases of the single beam load cells described above, the gages could alternatively be displaced with respect to the longitudinal axis of the beams or could be both displaced and rotated. Also, one or both gages could be applied to the opposite surface of one or both of the beams 111, 112. Analogous to the case with the single beam described above, the primary criteria are that one gage be applied to each beam to sense tensile strain and the other to sense compressive strain and that the gages be positioned to provide a correctible response to off-set loading so that the effects of such loading can be compensated. Further, special strain gages, as exemplified in FIG. 6 and described above, could also be employed in place of or along with conventional gages.

The dual beam load cell 110 of FIGS. 13 and 14 can be compensated for off-center loading, lateral or longitudinal or both, by connecting appropriate resistor networks to one or more of the gages. Appropriate resistor networks for such correction are determined in accordance with the same procedures as described above in connection with FIGS. 1-12. When the strain gages 1 to 4 are connected in a suitable bridge arrangement, test series and/or shunt resistors are connected with certain of the gages and readings taken with the weight positioned at longitudinally and laterally spaced locations on a scale platform and entered into a table such as Tables I and II above. The data thus taken may then be used in the manner described above to determine appropriate resistor networks to be connected to certain of the gages to compensate for lateral and/or longitudinal off-center loading on scale platform 120.

Figure 15:
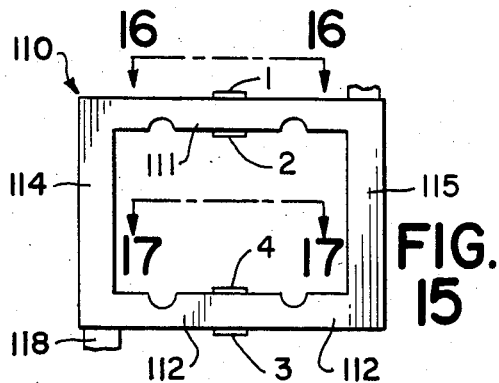
FIG. 15 is a side view of a weighing mechanism similar to that of FIGS. 13 and 14 but with the strain gages positioned differently.
Figure 16:
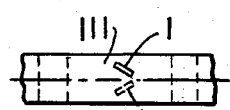
FIG. 16 is a view of a fragment of the upper beam in the weighing mechanism of FIG. 15 illustrating the position of the strain gages on the upper beam.
Figure 17:
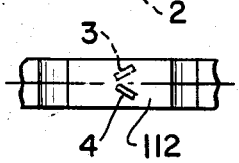
FIG. 17 is a view similar to FIG. 16 of the lower beam in the weighing mechanism of FIG. 15.

FIGS. 15, 16 and 17 show the dual beam load cell 110 of FIG. 13 and 14 with strain gages positioned somewhat differently from the gages shown in FIGS. 13 and 14. In FIG. 15 to 17, gages 1 and 2 are positioned on opposite surfaces of beam 111 and are both rotated and displaced with respect to the longitudinal axis of beam 111 in opposite directions from each other. Similarly, gages 3 and 4 are applied to opposite surfaces of lower beam 112 and are rotated and displaced in opposite directions with respect to the longitudinal axis of beam 112. Gages 3 and 4 are preferably rotated and displaced oppositely from the corresponding gages 1, 2, respectively, on beam 111.

The dual beam load cell 110 with strain gages 1 to 4 mounted thereon as illustrated in FIGS. 15-17, can, in the same manner as described above, be compensated for off-center loading, lateral or longitudinal or both, by following the procedures described above and connecting appropriate resistor networks to one or more of the gages. Gages of special configuration, as exemplified in FIG. 6 and described above, could, as in the previous embodiments, be used in place of conventional gages.

Figure 18:
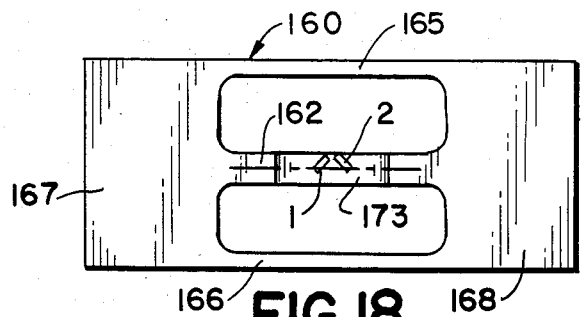
FIG. 18 is a side view of a load cell according to this invention incorporating a single shear beam and a pair of flexure arms.
Figure 19:
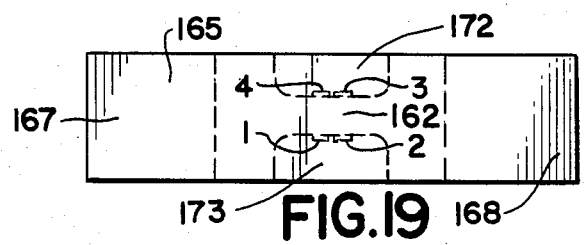
FIG. 19 is a top view of the load cell of FIG. 18.
Figure 20:
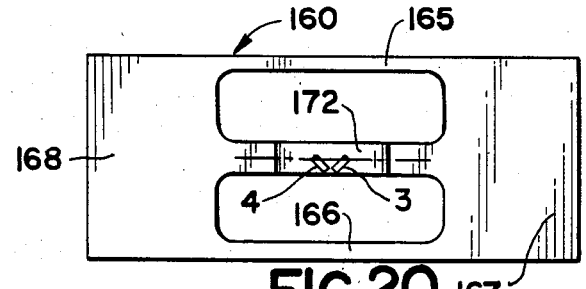
FIG. 20 is a side view of the opposite side of the load cell of FIG. 18.

FIGS. 18 to 20 show a load cell 160 incorporating a single shear beam 162 as the load responsive member. Load cell 160 also includes flexure arms 165, 166 extending substantially parallel to beam 162 between support members 167 and 168. Strain gage pairs 1, 2 and 3, 4 are provided on opposite sides of shear beam 162 at reduced sections formed by cut-outs 172, 173 in the edge of the beam to sense shear strains therein. As shown in FIGS. 18 and 20, the gages 1, 2 and 3, 4 of each pair are positioned in the normal shear orientation rotated with respect to the longitudinal axis of beam 162 in opposite directions from each other and from the gage on the oposite side of beam 162. As in the previous embodiments, gages 1 to 4 are positioned on beam 162 to be sensitive to strains caused by off-center loading so that compensation for such loading can be more easily obtained. The two pairs of gages are displaced in opposite directions from the longitudinal axis of beam 162. Again, the gages may be rotated from the normal orientation and/or special gages as exemplified in FIG. 6 may be used in place of, or along with, conventional gages.

The load cell 160 of FIGS. 18 to 20 can, in the same manner and with the same procedures, be compensated for off-center loading, lateral or longitudinal or both, by connecting appropriate resistor networks to one or more of the gages.

As is evident from FIGS. 1 to 6, 10 and 13 to 20 and the discussions above, there are many ways to position the strain gages on one or more force responsive beam members to be sensitive to strains caused by offset loading and so that the effects of such off-set loading can be compensated. Generally, the pattern of gage placement on the beam or beams should be such that the responses to movement of the load of the respective gages, when considered to be connected in a bridge arrangement, tend to cancel each other. Thus, the pattern might be such that two of the gages would tend to increase their output in response to the type of shift being considered (longitudinal or lateral) while the other two gages would be seen to decrease their outputs. Also, when intending to correct for both lateral and longitudinal displacement of the load, the pair of strain gages that may have resistor networks attached to compensate for longitudinal off-set must not be the same pair that would have resistor networks attached to correct for lateral off-set. Bridge balance too, of course, must be maintainable. Application of these principles will yield many suitable orientations and patterns for placement of the gages to enable load shift compensation.

More specifically, consider equation (3) above and the load cell 110 of FIG. 14 with its strain gages 1 to 4 connected in the bridge circuit of FIG. 8 without compensating resistors. The change in the output of the bridge of FIG. 8 resulting from moving the load from point C to point A in FIG. 14 is proportional to $$a1-a2+a3-a4=a$$

where a1 to a4 are the changes in arm resistance due to moving the load from the center of the platter to position A and $a=a1-a2+a3-a4$.

Similarly, for movement to position B on the platter, the change in output of the bridge is proportional to $$b1-b2+b3-b4=b$$

where b1 to b4 are the changes in arm resistance due to moving the load from the center of the platter to position B and $b=b1-b2+b3-b4$.

If a and b are made substantially equal to zero then the load cell is compensated. According to the invention, this may be done by attenuating the gage factor of the appropriate individual gages by the addition of resistor networks so that both terms, a and b, are small or zero.

To accomplish this, the gages are preferably positioned on the beam or beams so that the signs of their resistance changes as a result of load shift (b1 to b4, a1 to a4) are such that the equations for both b and a contain both positive and negative terms, thus making it relatively easy to reduce b and a to near zero by attenuating the appropriate terms with resistor networks.

The equations for a and b with attentuation factors A become $$a=(A1\times a1)-(A2\times a2)+(A3\times a3)-(A4\times a4)$$

$$b=(A1\times b1)-(A2\times b2)+(A3\times b3)-(A4\times b4).$$

In the dual beam load cell 110 of FIG. 14, movement from the center of platter 120 to position A is a longitudinal load shift while movement from the center to position B is a transverse load shift. The gages are positioned such that the signs of the changes in resistance of the bridge arms, due to these load shifts, are as shown below.

| | ARM 1 | ARM 2 | ARM 3 | ARM 4 |
|---|---|---|---|---|
| A | + | + | − | − |
| B | + | − | − | + |

That is, for shift to position A, arms 1 and 2 will show an increase in resistance and arms 3 and 4 will show a decrease in resistance. For shift to position B arms 1 and 4 will show increases and arms 2 and 3 decreases in resistance.

Recall that $$a=(A1\times a1)-(A2\times a2)+(A3\times a3)-(A4\times a4)$$

Considering only the signs of the resistance changes a1 to a4, the above equation for a can be written as

| ARM 1 | | ARM 2 | | ARM 3 | | ARM 4 |
|---|---|---|---|---|---|---|
| (+) | − | (+) | + | (−) | − | (−) |

Absorbing the negative signs into the numbers in parentheses yields,

| ARM 1 | | ARM 2 | | ARM 3 | | ARM 4 |
|---|---|---|---|---|---|---|
| (+) | + | (−) | + | (−) | + | (+) |

Thus, there are two positive terms and two negative terms in the equation for a. If the uncompensated a is positive, arms 1 and 4 can be attenuated in order to reduce a, the change in bridge output resulting from shift of the load to position A in FIG. 14, to zero. Conversely, if the uncompensated a is negative then arms 2 and 3 can be attenuated in order to reduce a to zero. Mathematically this can be accomplished by attenuating one or both arms. However, the resistor networks should be added in such a way as to maintain bridge balance.

For transverse displacement of the load, that is, to point B in FIG. 14 the same approach is used.

$$b=(A1\times b1)-(A2\times b2)+(A3\times b3)-(A4\times b4).$$

using the signs of b1 to b4 determined above and then combining signs:

| ARM 1 | | ARM 2 | | ARM 3 | | ARM 4 |
|---|---|---|---|---|---|---|
| (+) | − | (−) | + | (−) | − | (+) |
| (+) | + | (+) | + | (−) | + | (−) |

Here, the choices are to attenuate arms 1 and 2 of the bridge if b is a positive number and to attenuate arms 3 and 4 if b is negative. Note that the gage pairs resulting here are (1,2) and (3,4) while for the longitudinal shift case above they were (1,4) and (2,3). Thus, the gage pairs available for attenuation in the longitudinal and lateral directions are different and compensation for the two directions is substantially independent. This results from the gages having been positioned, off-set and/or rotated, on the beam or beams to tend to produce this result. The sizes of the attenuating resistors to be connected in circuit with the appropriate gages to achieve compensation can be determined as described previously herein.

Figure 11:
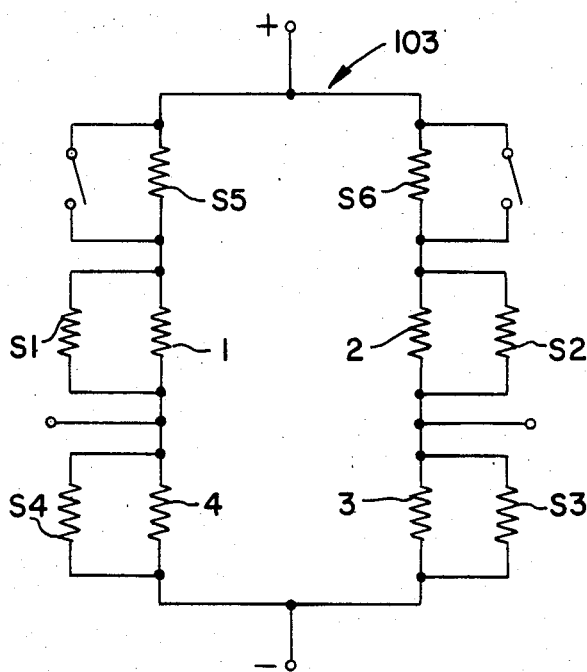
FIG. 11 shows a suitable electrical bridge arrangement for interconnecting the strain gages and for connecting compensating resistors to the strain gages of the single beam member of FIG. 10A.

As another example, consider the load cell 100 of FIG. 12 with its gages connected in the bridge of FIG. 11 without test compensating resistors. If A represents longitudinal shift (to position m or p in FIG. 12) and B represents lateral shift (to position l or n in FIG. 12) then the signs of the arm resistance changes a1 to a4 and b1 to b4 are:

| | ARM 1 | ARM 2 | ARM 3 | ARM 4 |
|---|---|---|---|---|
| A | + | + | + | + |
| B | + | − | − | + |

Following the same procedure as above the expression for a is $$a=(A1\times a1)-(A2\times a2)+(A3\times a3)-(A4\times a4)$$

The signs reduce to

| ARM 1 | | ARM 2 | | ARM 3 | | ARM 4 |
|---|---|---|---|---|---|---|
| (+) | − | (+) | + | (+) | − | (+) |

Absorbing the signs yields $$(+)+(-)+(+)+(-)$$

The arms usable for longitudinal correction are 1 and 3 if a is positive and 2 and 4 if a is negative. Notice that the usable arm pairs are not composed of adjacent arms but rather of arms that are on opposite sides of the bridge. To preserve bridge balance a solution is to place a shunt resistor across one arm and a series resistor in the opposite arm. If they are properly matched the arms will be attenuated and the balance will be preserved.

For transverse load shifts, in a similar manner, it follows that $$b = (A1 \times b1) - (A2 \times b2) + (A3 \times b3) - (A4 \times b4).$$

$$(+)-(-)+(-)-(+)$$

$$(+)+(+)+(-)+(-)$$

Here, the arms to be attenuated for positive b are 1 and 2 and for negative b are 3 and 4. These pairs are different, then, from the longitudinal case so the results will tend to be independent. Again the positioning of the gages tended to produce this result. The rotations and/or displacements cause resistive changes of signs that caused independence. The sizes of the compensating resistors needed are, as before, determined in accordance with the procedures described above.

Figure 21:
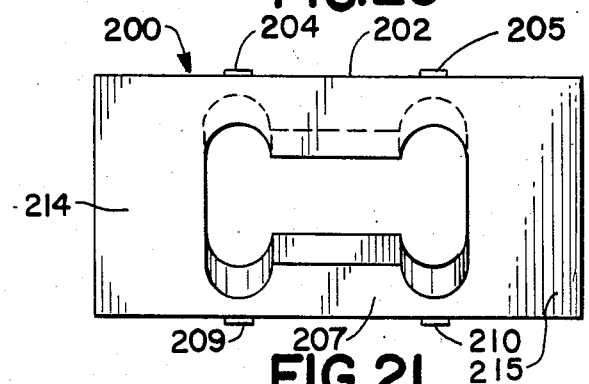
FIG. 21 is a side view of a load cell according to this invention in which the beams are altered to produce a correctible response to off-set loading.
Figure 22:
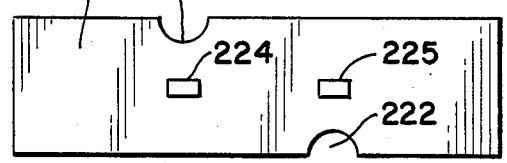
FIG. 22 is a plan view of another beam altered to produce a correctible response to off-set loading.
Figure 23:
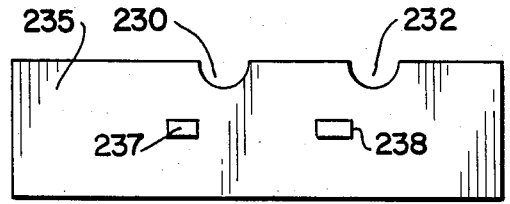
FIG. 23 is a plan view of still another beam altered to provide a correctible response to off-set loading.

As described above, in accordance with the present invention the strain gages on a load responsive beam or beams may be caused to produce a correctible response to off-set loading by physically altering the beam(s) rather than, or in addition to, rotating and/or displacing the gages on the beam. FIGS. 21 to 23 illustrate beams physically altered to permit correction for offset loading by the connection of compensating resistors to one or more of the strain gages.

In FIG. 21 a load cell 200 has an upper beam 202 with strain gages 204, 205 mounted thereon and a lower beam 207 with gages 209, 210 mounted on its lower surface. The beams are integrally connected between vertical support members 214, 215. Each beam 202, 207 is tapered in thickness, beam 202 increasing in thickness toward the viewer and beam 202 decreasing as shown in FIG. 21. Each set of strain gages 204, 205 for beam 202 and 209, 210 for beam 207 is symmetrical and aligned with the longitudinal axis of the respective beam. Tapering the thickness of the beams while mounting the gages straight and centered on the beams results in the position of the gages relative to the neutral axes of the beams being such as to cause the gages, when connected in a bridge, to produce a correctible response to off-center loading. Load cell 200 may be compensated for the effects of such off-center loading by generating data of the type in Tables I and II above and using that data and the procedures set forth above to determine the compensating resistors to be connected in circuit with one or more of the gages on load cell 200.

FIGS. 22 and 23 illustrate other possible physical alterations to gaged beams to cause the gages mounted thereon to produce correctible responses to off-set loading of load cells incorporating the beams. In FIG. 22, beam 220 is physically altered by cutouts 221, 222 adjacent centered gages 224, 225. The positions and size of the cutouts relative to the gages could, of course, be adjusted as desired. In FIG. 23, two cutouts 230, 232 are placed in the same edge of beam 235 with centered gages 237, 238. Load cells incorporating the beams of FIGS. 22 and 23 may be compensated for off-set loading with compensating resistors by following the procedures described above.

What is claimed is:

1. A moment-insensitive load cell comprising a single beam member having a longitudinal and a lateral axis, said beam member having only first and second pairs of strain gauges mounted thereon, all of said gauges being mounted on the same horizontal surface of said beam member, the gauges of each pair being spaced apart longitudinally and sensing tensile and compressive strains, respectively, in said beam, the positions of said first pair of strain gauges with respect to the neutral axis of the beam being such that the gauges produce a correctable output response to loads applied off-center on said beam, said first and second pairs of strain gauges being connected in a bridge circuit, means for applying a load on said beam member between longitudinally spaced gauges, and a resistor connected in circuit with at least one of said strain gauges to make the output of said bridge circuit substantially independent of the position along at least one axis of said beam of a load applied thereto.

2. A load cell as claimed in claim 1 wherein each of the strain gages of said first pair is mounted on said beam with at least a portion of its strain sensing elements at an angle to the longitudinal axis of the beam.

3. A load cell as claimed in claim 1 wherein each of the strain gages of said first pair is displaced from the longitudinal axis of the beam.

4. A load cell as claimed in claim 1 wherein material is removed from one side of said beam to cause said gages to produce a correctible output response to off-center loading.

5. A load cell as claimed in claim 1 including a base, a load receiving arm spaced from said base, said beam being connected between said load receiving arm and said base, and at least one flexure arm extending generally parallel to said beam and interconnecting said load receiving arm and base.

6. A method of making a moment-insensitive compensated load cell comprising the steps of providing a single beam member having longitudinal and lateral axes, mounting first and second pairs of strain gauges on the same horizontal surface of said beam with the gauges of each pair spaced apart longitudinally, providing load receiving means for applying a load on said beam member between the longitudinally spaced gauges, adjusting the relative positions of the first pair of gauges and the neutral axis of the beam so that the gauges produce a correctible response to loads applied off-center on said beam, connecting the first and second pairs of gauges in a bridge circuit, placing test compensating resistors in circuit with at least some of the gauges, determining the response of the bridge circuit to loads applied off-center on said beam between the longitudinally spaced gauges, using said response and the values of the test compensating resistors to calculate the values of resistors to be connected in circuit with said gauges to compensate for the effects of off-center loading, and connecting resistors of the proper value in circuit with the gauges to make the output of the bridge circuit substantially independent of the position of a load along at least one axis of the beam member.

7. A load cell comprising two substantially parallel beams having longitudinal and lateral axes, means rigidly connecting one end of said beams together, means rigidly connecting the other end of the beams together, a pair of strain gauges mounted on a horizontal surface of each of the beams to detect bending strains therein, at least one strain gauge on each beam having at least a portion of its strain sensing elements oriented at an angle to the longitudinal axis of the beam, means connecting the gauges in a bridge circuit, and a resistor connected in circuit with at least one of the gauges to make the output of the bridge circuit substantially independent of the position of a load along at least one of said axes.

8. A load cell as claimed in claim 7 wherein at least one strain gage on each beam is displaced from the longitudinal axis of the beam.

9. A method of compensating a load cell having two parallel beam members with longitudinal and lateral axes, comprising the steps of mounting a pair of strain gauges on a horizontal surface of each beam to detect bending strains therein and so that at least one gauge on each beam has at least a portion of its strain sensing elements oriented at an angle to the longitudinal axis of the beam, connecting the gauges in a bridge circuit, placing test compensating resistors in circuit with said gauges, determining the response of said bridge circuit to loads applied off-center on said load cell, using said response and the values of the test compensating resistors to calculate the values of resistors to be connected in circuit with said gauges to compensate for the effects of off-center loading, and connecting resistors of the proper value in circuit with said gauges to make the output of said bridge circuit substantially independent of the position of a load along at least one axis of the beam members.

10. A load cell comprising at least one elongated beam, having a longitudinal and a lateral axis, a pair of strain gages on said beam, said beam having material removed from one side thereof to cause said gages to produce a correctible response to an off-set load on said beam, and a resistor connected in circuit with at least one of said gages to make the output of the gages substantially independent of the position along at least one axis of the beam of a load applied thereto.

11. A load cell as claimed in claim 10 including a second beam substantially parallel to the first beam, said beams being rigidly connected together at each end, a pair of strain gages on said second beam, means connecting all of the strain gages in a bridge circuit, each of said beams having material removed from a side thereof to cause said bridge to produce a correctible response to an off-set load on said load cell.

12. A load cell comprising an elongated beam having a longitudinal and a lateral axis, strain gages mounted on a vertical surface of said beam to detect shear strains therein resulting from a load applied to said beam, means connecting said strain gages in an electrical bridge circuit, said gages being positioned with respect to the neutral axis of the beam to increase the sensitivity of the gages to loads applied off center on said beam, and a resistor connected in circuit with at least one of said gages to make the output of the bridge circuit substantially independent of the position along at least one axis of the beam of a load applied thereto.

13. A load cell as claimed in claim 12 wherein each of said strain gages is mounted on said beam with at least a portion of its strain sensing elements rotated at a small angle from the shear strain detecting position to increase the sensitivity of the gages to loads applied off center on the beam.

14. A load cell as claimed in claim 12 wherein each of said strain gages is displaced vertically from the neutral axis of the beam to increase the sensitivity of the gages to loads applied off center on the beam.

15. A load cell as claimed in claim 12 wherein material is removed from one side of said beam to cause said increase in the sensitivity of the gages to loads applied off center on the beam.

16. A load cell as claimed in claim 10 including a base, a load receiving arm spaced from said base, said beam being connected between said load receiving arm and said base, and at least one flexure arm extending generally parallel to said beam and interconnecting said load receiving arm and base.

17. A method of compensating a shear beam load cell including an elongated beam having a longitudinal and a lateral axis, strain gages mounted on a vertical surface of said beam to detect shear strains therein resulting from a load applied to said beam, the strain gages being connected in an electrical bridge circuit, comprising the steps of positioning said strain gages with respect to the neutral axis of the beam to increase the sensitivity of the gages to loads applied off center on the beam, placing test compensating resistors in circuit with said gages, determining the differences in output readings of said bridge circuit for loads applied at different positions on said load cell, using said differences and the values of the test compensating resistors to calculate the values of resistors to be connected in circuit with said gages to substantially eliminate said differences, and connecting a resistor of the proper value in circuit with at least one of said gages to make the output of the bridge circuit substantially independent of the position of a load along at least one of said longitudinal and lateral axes.

* * * * *